(12) United States Patent
Fitzgerald et al.

(10) Patent No.: US 11,736,508 B2
(45) Date of Patent: Aug. 22, 2023

(54) SYSTEM AND METHOD FOR MANAGING THE SECURITY HEALTH OF A NETWORK DEVICE

(71) Applicant: Johnson Controls Tyco IP Holdings LLP, Milwaukee, WI (US)

(72) Inventors: William M. Fitzgerald, Tipperary (IE); Miguel Morillo Iruela, Cork (IE); Silviu G. Sosiade, Cork (IE); Vincent P. Hamilton, Cork (IE); Seán Phillips, Cork (IE)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 456 days.

(21) Appl. No.: 16/887,882

(22) Filed: May 29, 2020

(65) Prior Publication Data

US 2021/0185074 A1  Jun. 17, 2021

Related U.S. Application Data

(60) Provisional application No. 62/854,051, filed on May 29, 2019.

(51) Int. Cl.
*H04L 9/40* (2022.01)
*G16Y 30/10* (2020.01)
*H04W 4/02* (2018.01)

(52) U.S. Cl.
CPC .......... *H04L 63/1433* (2013.01); *G16Y 30/10* (2020.01); *H04L 63/1408* (2013.01); *H04L 63/1425* (2013.01); *H04W 4/02* (2013.01)

(58) Field of Classification Search
CPC ............ H04L 63/1433; H04L 63/1408; H04L 63/1425; G16Y 30/10; H04W 4/02
USPC .......................................................... 726/25
See application file for complete search history.

(56) References Cited

U.S. PATENT DOCUMENTS

| 9,507,944 | B2 * | 11/2016 | Lotem | G06F 21/577 |
| 9,876,811 | B2 * | 1/2018 | Maria | H04W 28/0268 |
| 11,057,418 | B2 * | 7/2021 | Ocepek | H04L 63/20 |
| 2007/0192867 | A1 * | 8/2007 | Miliefsky | G06F 21/577 |
| | | | | 726/25 |
| 2011/0071685 | A1 | 3/2011 | Huneycutt et al. | |
| 2015/0381649 | A1 * | 12/2015 | Schultz | G06Q 10/0635 |
| | | | | 726/25 |

(Continued)

*Primary Examiner* — Sakinah White Taylor
(74) *Attorney, Agent, or Firm* — Foley & Lardner LLP

(57) ABSTRACT

A system and method for managing the security health of a network devices interconnected with each other in a service provided in an entity. The security health of the networked device is evaluated by determining a cyber risk score for the entity having a plurality of devices. A first set of data from individual network devices and a second set of data including risk data from an external data source are collected by a data collector. The collected data is normalized into a format which can be further correlated by a correlation engine. The correlating step enables to determine cyber risk scores for the individual network devices. The cyber risk score for the entity may further be determined by aggregating the individual cyber risk scores of the individual network devices. The risk scores are displayed by a web-based user interface which is enabled by an application programming interface.

19 Claims, 7 Drawing Sheets

(56) References Cited

U.S. PATENT DOCUMENTS

| | | | |
|---|---|---|---|
| 2016/0112451 A1* | 4/2016 | Jevans | G06F 21/56 |
| | | | 726/25 |
| 2017/0048267 A1* | 2/2017 | Yampolskiy | H04W 84/12 |
| 2017/0346846 A1* | 11/2017 | Findlay | H04L 63/1433 |
| 2019/0087529 A1* | 3/2019 | Steingrimsson | G06F 30/00 |
| 2019/0156257 A1* | 5/2019 | Datta Ray | H04L 63/1433 |
| 2019/0265971 A1* | 8/2019 | Behzadi | G06Q 10/06 |

* cited by examiner

SYSTEM AND METHOD FOR MANAGING THE SECURITY HEALTH OF A NETWORK DEVICE

CROSS-REFERENCE TO RELATED PATENT APPLICATION

This application claims the benefit of and priority to U.S. Provisional Patent Application No. 62/854,051 filed May 29, 2019, the entire disclosure of which is incorporated by reference herein.

BACKGROUND

Devices forming part of a networked Operation Technology (hereinafter to be referred as OT) system are increasingly vulnerable to cyber-attacks. The large scale deployment of such devices makes practically managing the cybersecurity of these devices too difficult for a cybersecurity manager.

Smart Buildings, Smart Factories, and Smart Cities will increasingly face a new era of cyber-attacks, for example IoT Ransomware (e.g., Wannacry), SCADA Worms (e.g., Stuxnet), and DDoS Botnets (e.g., Mirai). Those responsible for Enterprise information security need to be able to assess the current and future cybersecurity risks facing OT infrastructure in their manufacturing plant, distribution facilities, and factory campuses, to name a few examples.

Operational Technologies (OT) are those systems that interconnect cyber space (cyber systems) with physical space (physical control systems). In the context of Smart Buildings, OT refers to an integrated superset of systems-of-systems, such as chillers (e.g., product temperature control), heating, ventilation and air conditioning (e.g., thermostats, ventilation fans), video surveillance systems (e.g. CCTV), physical access control systems (e.g., badge controllers), energy (e.g., microgrid, power generators), manufacturing or distribution systems (e.g., SCADA/PLC/SKU controllers), and so on.

Traditionally, OT has operated within closed and isolated environments. Today, for economic and practical reasons, the Smart Building OT ecosystem is tightly integrated with the Information Technology (hereinafter to be referred as IT) ecosystem. This integration has led to the creation of complex interconnected heterogeneous and distributed Smart Building environments. Another integration aspect refers to legacy OT that has not been designed with security in mind. OT devices or systems are difficult and expensive to retrofit. Therefore compensating controls must be provided at the integrated system level. Also the security of the device in the context of the system must be correctly and accurately measured.

The cyber-networked integration of OT systems too, not just IT systems, but also to other OT systems, in ways not originally intended, makes the Smart Building more vulnerable to existing and emerging cyber-attacks. For example, a compromised Smart Building system device (OT device) can be used to disrupt other Smart Building systems and enterprise IT systems, thereby giving rise to cascading and emergent threats. Threats include production down time, physical harm, leaking of intellectual property, product defects, and Enterprise IT attacks from Smart Building OT environments. Often attacks on OT infrastructures have more costly and devastating effects, especially the attacks carried out against critical infrastructure.

The management of Smart Buildings is complex, and effective configuration may be hampered by poor understanding and management of the OT cybersecurity domain which, in turn, may unnecessarily expose the Smart Building to known threats, regulatory fines, and brand reputational damage. The handling and assessment of the OT cybersecurity events can be a 'grey area' where the responsibility and ownership of the task is often disputed between the provider of the IT infrastructure security and the group in charge of providing the perimeter security for the building.

The scale and breadth of the use of OT-enabled devices, along with the rapidly changing landscape of at-risk devices, makes effectively managing the cybersecurity health of a network extremely difficult for a cybersecurity manager. Cybersecurity managers need a mechanism to identify and rank the at-risk devices on their network.

A building management system (BMS) is, in general, a system of devices configured to control, monitor, and manage equipment in or around a building or building area. A BMS can include a heating, ventilation, or air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include METASYS® building controllers or other devices sold by Johnson Controls, Inc., as well as building devices and components from other sources.

Therefore, there is a long standing need for predicting a cyber vulnerability of every device present within a service or a facility of an entity or a body incorporate by implementations of a risk measuring score for each device which can predict a total cyber risk score for the service or facility or entity.

SUMMARY

According to one embodiment, a method for determining a cyber risk score for an entity having a plurality of devices on a network is disclosed. The method may comprise collecting, by a processing circuit, a first set of data from individual network devices and a second set of data including risk data from an external data source. The may further comprise normalizing, by the processing circuit, the first set of data and the second set of data. The method may further comprise correlating, the normalized first set of data with the normalized second set of data to determine individual cyber risk scores for the individual network devices, by the processing circuit. The method may further comprise determining, the cyber risk score for the entity by aggregating the individual cyber risk scores of the individual network devices, by the processing circuit.

According to another embodiment, a system for determining a cyber risk score for an entity having a plurality of network devices is disclosed. The system may comprise a server, comprising a processing circuit having a memory storing processing instructions, said processing circuit configured to collect a first set of data from individual network devices and a second set of data including risk data from an external data source. The processing circuit is further configured to normalize the first set of data and the second set of data. The processing circuit is further configured to correlate the normalized first set of data with the normalized second set of data to determine individual cyber risk scores for the individual network devices. The processing circuit is further configured to determine, the cyber risk score for the entity by aggregating the individual cyber risk scores of the individual network devices.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Building and Building Management System

Figure 1:
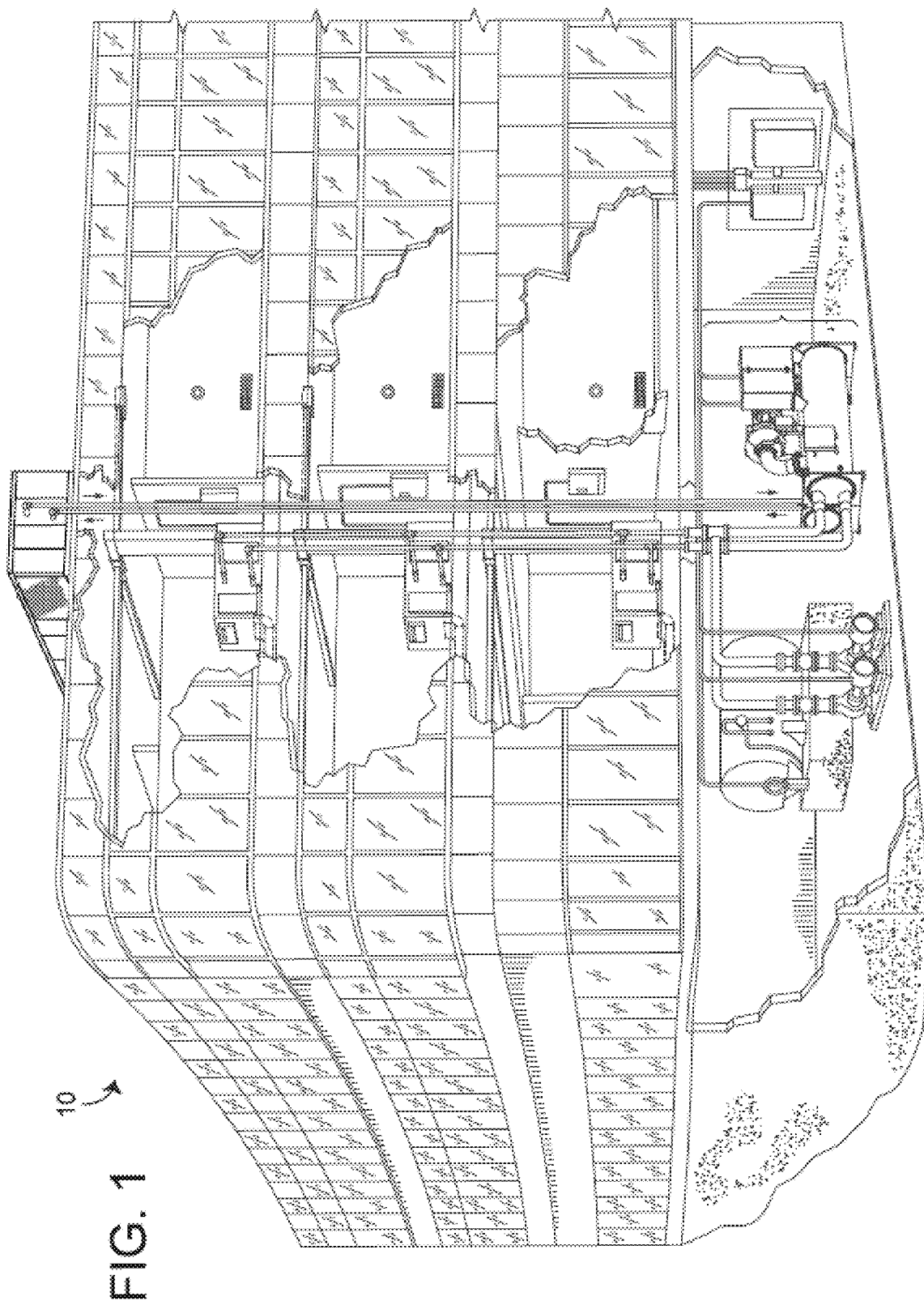
FIG. 1 is a drawing of a building equipped with a building management system (BMS), according to some embodiments.

Referring now to FIG. 1, a perspective view of a building 10 is shown, according to an exemplary embodiment. A BMS serves building 10. The BMS for building 10 may include any number or type of devices that serve building 10. For example, each floor may include one or more security devices, video surveillance cameras, fire detectors, smoke detectors, lighting systems, HVAC systems, or other building systems or devices. In modern BMSs, BMS devices can exist on different networks within the building (e.g., one or more wireless networks, one or more wired networks, etc.) and yet serve the same building space or control loop. For example, BMS devices may be connected to different communications networks or field controllers even if the devices serve the same area (e.g., floor, conference room, building zone, tenant area, etc.) or purpose (e.g., security, ventilation, cooling, heating, etc.). Also a BMS may connect back, partially reuse (e.g., reuse the same Domain Controller for Identity Management) or have dedicated communications points (e.g., CRM integration) with the standard IT infrastructure hosted in the managed building.

BMS devices may collectively or individually be referred to as building equipment. Building equipment may include any number or type of BMS devices within or around building 10. For example, building equipment may include controllers, chillers, rooftop units, fire and security systems, elevator systems, thermostats, lighting, serviceable equipment (e.g., vending machines), and/or any other type of equipment that can be used to control, automate, or otherwise contribute to an environment, state, or condition of building 10. The terms "BMS devices," "BMS device" and "building equipment" are used interchangeably throughout this disclosure.

Figure 2:
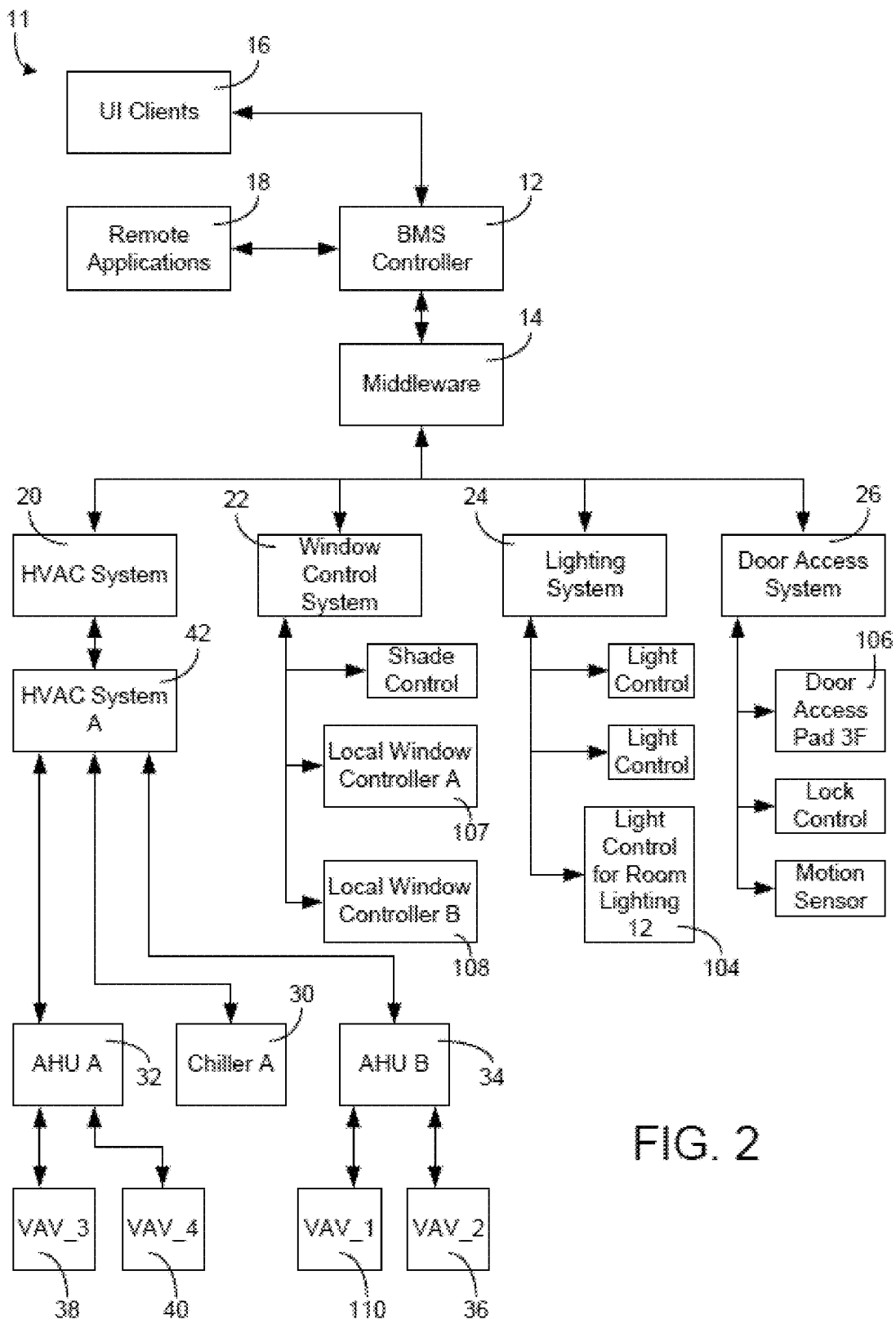
FIG. 2 is a block diagram of a BMS that serves the building of FIG. 1, according to some embodiments.

Referring now to FIG. 2, a block diagram of a BMS 11 for building 10 is shown, according to an exemplary embodiment. BMS 11 is shown to include a plurality of BMS subsystems 20-26. Each BMS subsystem 20-26 is connected to a plurality of BMS devices and makes data points for varying connected devices available to upstream BMS controller 12. Additionally, BMS subsystems 20-26 may encompass other lower-level subsystems. For example, an HVAC system may be broken down further as "HVAC system A," "HVAC system B," etc. In some buildings, multiple HVAC systems or subsystems may exist in parallel and may not be a part of the same HVAC system 20.

As shown in FIG. 2, BMS 11 may include a HVAC system 20. HVAC system 20 may control HVAC operations building 10. HVAC system 20 is shown to include a lower-level HVAC system 42 (named "HVAC system A"). HVAC system 42 may control HVAC operations for a specific floor or zone of building 10. HVAC system 42 may be connected to air handling units (AHUs) 32, 34 (named "AHU A" and "AHU B," respectively, in BMS 11). AHU 32 may serve variable air volume (VAV) boxes 38, 40 (named "VAV_3" and "VAV_4" in BMS 11). Likewise, AHU 34 may serve VAV boxes 36 and 110 (named "VAV_2" and "VAV_1"). HVAC system 42 may also include chiller 30 (named "Chiller A" in BMS 11). Chiller 30 may provide chilled fluid to AHU 32 and/or to AHU 34. HVAC system 42 may receive data (i.e., BMS inputs such as temperature sensor readings, damper positions, temperature setpoints, etc.) from AHUs 32, 34. HVAC system 42 may provide such BMS inputs to HVAC system 20 and on to middleware 14 and BMS controller 12. Similarly, other BMS subsystems may receive inputs from other building devices or objects and provide the received inputs to BMS controller 12 (e.g., via middleware 14).

Middleware 14 may include services that allow interoperable communication to, from, or between disparate BMS subsystems 20-26 of BMS 11 (e.g., HVAC systems from different manufacturers, HVAC systems that communicate according to different protocols, security/fire systems, IT resources, door access systems, etc.). Middleware 14 may be, for example, an EnNet server sold by Johnson Controls, Inc. While middleware 14 is shown as separate from BMS controller 12, middleware 14 and BMS controller 12 may be integrated in some embodiments. For example, middleware 14 may be a part of BMS controller 12.

Still referring to FIG. 2, window control system 22 may receive shade control information from one or more shade controls, ambient light level information from one or more light sensors, and/or other BMS inputs (e.g., sensor information, setpoint information, current state information, etc.) from downstream devices. Window control system 22 may include window controllers 107, 108 (e.g., named "local window controller A" and "local window controller B," respectively, in BMS 11). Window controllers 107, 108 control the operation of subsets of window control system 22. For example, window controller 108 may control window blind or shade operations for a given room, floor, or building in the BMS.

Lighting system 24 may receive lighting related information from a plurality of downstream light controls (e.g., from room lighting 104). Door access system 26 may receive lock control, motion, state, or other door related information from a plurality of downstream door controls. Door access system 26 is shown to include door access pad 106 (named "Door Access Pad 3F"), which may grant or deny access to a building space (e.g., a floor, a conference room, an office, etc.) based on whether valid user credentials are scanned or entered (e.g., via a keypad, via a badge-scanning pad, etc.).

BMS subsystems 20-26 may be connected to BMS controller 12 via middleware 14 and may be configured to provide BMS controller 12 with BMS inputs from various BMS subsystems 20-26 and their varying downstream devices. BMS controller 12 may be configured to make differences in building subsystems transparent at the human-machine interface or client interface level (e.g., for connected or hosted user interface (UI) clients 16, remote applications 18, etc.). BMS controller 12 may be configured to describe or model different building devices and building subsystems using common or unified objects (e.g., software objects stored in memory) to help provide the transparency. Software equipment objects may allow developers to write applications capable of monitoring and/or controlling various types of building equipment regardless of equipment-specific variations (e.g., equipment model, equipment manufacturer, equipment version, etc.). Software building objects may allow developers to write applications capable of monitoring and/or controlling building zones on a zone-by-zone level regardless of the building subsystem makeup.

Figure 3:
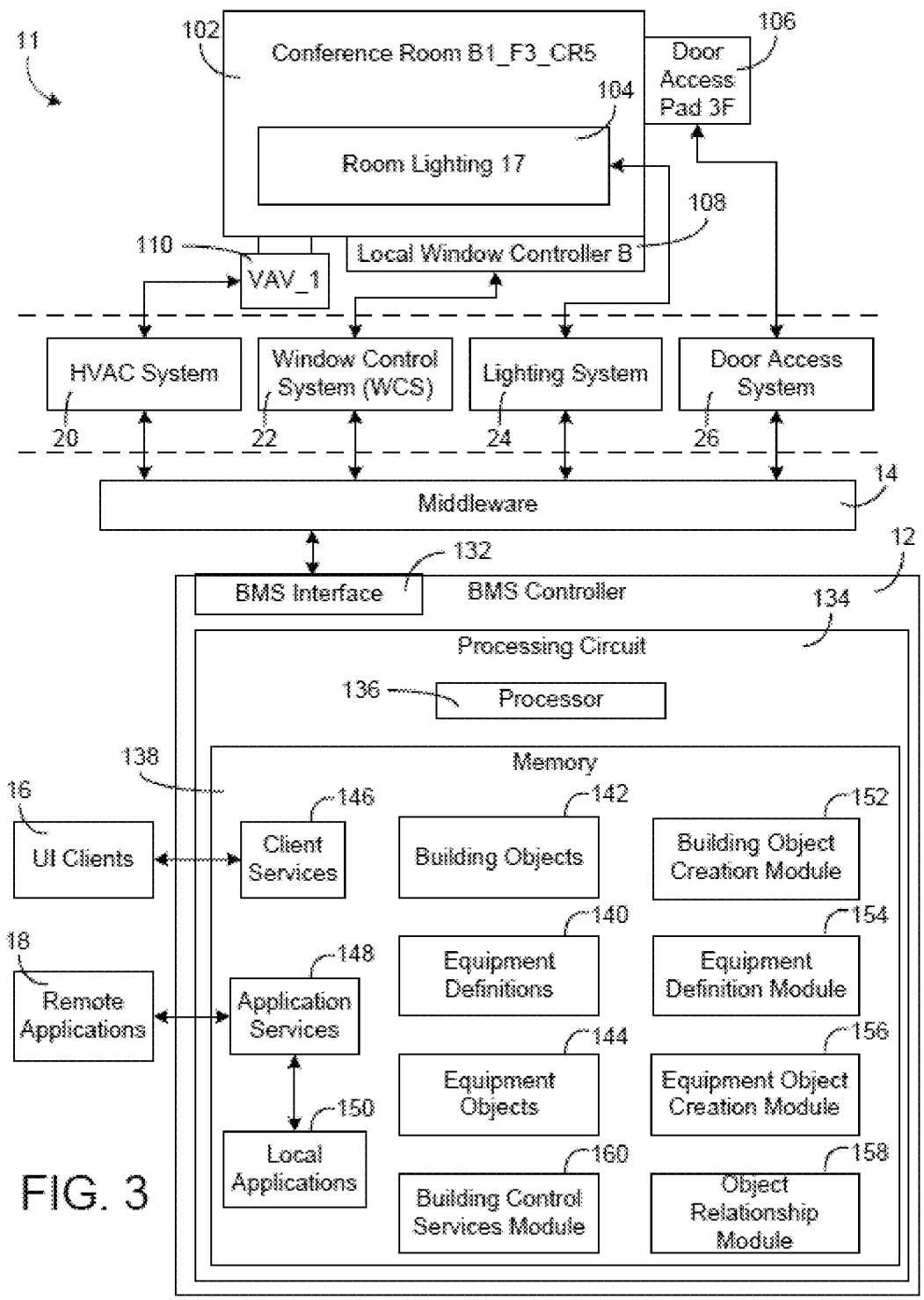
FIG. 3 is a block diagram of a BMS controller which can be used in the BMS of FIG. 2, according to some embodiments.

Referring now to FIG. 3, a block diagram illustrating a portion of BMS 11 in greater detail is shown, according to an exemplary embodiment. Particularly, FIG. 3 illustrates a portion of BMS 11 that services a conference room 102 of building 10 (named "B1_F3_CR5"). Conference room 102 may be affected by many different building devices connected to many different BMS subsystems. For example, conference room 102 includes or is otherwise affected by VAV box 110, window controller 108 (e.g., a blind controller), a system of lights 104 (named "Room Lighting 17"), and a door access pad 106.

Each of the building devices shown at the top of FIG. 3 may include local control circuitry configured to provide signals to their supervisory controllers or more generally to the BMS subsystems 20-26. The local control circuitry of the building devices shown at the top of FIG. 3 may also be configured to receive and respond to control signals, commands, setpoints, or other data from their supervisory controllers. For example, the local control circuitry of VAV box 110 may include circuitry that affects an actuator in response to control signals received from a field controller that is a part of HVAC system 20. Window controller 108 may include circuitry that affects windows or blinds in response to control signals received from a field controller that is part of window control system (WCS) 22. Room lighting 104 may include circuitry that affects the lighting in response to control signals received from a field controller that is part of lighting system 24. Access pad 106 may include circuitry that affects door access (e.g., locking or unlocking the door) in response to control signals received from a field controller that is part of door access system 26.

Still referring to FIG. 3, BMS controller 12 is shown to include a BMS interface 132 in communication with middleware 14. In some embodiments, BMS interface 132 is a communications interface. For example, BMS interface 132 may include wired or wireless interfaces (e.g., jacks, antennas, transmitters, receivers, transceivers, wire terminals, etc.) for conducting data communications with various systems, devices, or networks. BMS interface 132 can include an Ethernet card and port for sending and receiving data via an Ethernet-based communications network. In another example, BMS interface 132 includes a Wi-Fi transceiver for communicating via a wireless communications network. BMS interface 132 may be configured to communicate via local area networks or wide area networks (e.g., the Internet, a building WAN, etc.).

In some embodiments, BMS interface 132 and/or middleware 14 includes an application gateway configured to receive input from applications running on client devices. For example, BMS interface 132 and/or middleware 14 may include one or more wireless transceivers (e.g., a Wi-Fi transceiver, a Bluetooth transceiver, a NFC transceiver, a cellular transceiver, etc.) for communicating with client devices. BMS interface 132 may be configured to receive building management inputs from middleware 14 or directly from one or more BMS subsystems 20-26. BMS interface 132 and/or middleware 14 can include any number of software buffers, queues, listeners, filters, translators, or other communications-supporting services.

Still referring to FIG. 3, BMS controller 12 is shown to include a processing circuit 134 including a processor 136 and memory 138. Processor 136 may be a general purpose or specific purpose processor, an application specific integrated circuit (ASIC), one or more field programmable gate arrays (FPGAs), a group of processing components, or other suitable processing components. Processor 136 is configured to execute computer code or instructions stored in memory 138 or received from other computer readable media (e.g., CDROM, network storage, a remote server, etc.).

Memory 138 may include one or more devices (e.g., memory units, memory devices, storage devices, etc.) for storing data and/or computer code for completing and/or facilitating the various processes described in the present disclosure. Memory 138 may include random access memory (RAM), read-only memory (ROM), hard drive storage, temporary storage, non-volatile memory, flash memory, optical memory, or any other suitable memory for storing software objects and/or computer instructions. Memory 138 may include database components, object code components, script components, or any other type of information structure for supporting the various activities and information structures described in the present disclosure. Memory 138 may be communicably connected to processor 136 via processing circuit 134 and may include computer code for executing (e.g., by processor 136) one or more processes described herein. When processor 136 executes instructions stored in memory 138 for completing the various activities described herein, processor 136 generally configures BMS controller 12 (and more particularly processing circuit 134) to complete such activities.

Still referring to FIG. 3, memory 138 is shown to include building objects 142. In some embodiments, BMS controller 12 uses building objects 142 to group otherwise ungrouped or unassociated devices so that the group may be addressed or handled by applications together and in a consistent manner (e.g., a single user interface for controlling all of the BMS devices that affect a particular building zone or room). Building objects can apply to spaces of any granularity. For example, a building object can represent an entire building, a floor of a building, or individual rooms on each floor. In some embodiments, BMS controller 12 creates and/or stores a building object in memory 138 for each zone or room of building 10. Building objects 142 can be accessed by UI clients 16 and remote applications 18 to provide a comprehensive user interface for controlling and/or viewing information for a particular building zone. Building objects 142 may be created by building object creation module 152 and associated with equipment objects by object relationship module 158, described in greater detail below.

Still referring to FIG. 3, memory 138 is shown to include equipment definitions 140. Equipment definitions 140 stores the equipment definitions for various types of building equipment. Each equipment definition may apply to building equipment of a different type. For example, equipment definitions 140 may include different equipment definitions for variable air volume modular assemblies (VMAs), fan coil units, air handling units (AHUs), lighting fixtures, water pumps, and/or other types of building equipment.

Equipment definitions 140 define the types of data points that are generally associated with various types of building equipment. For example, an equipment definition for VMA may specify data point types such as room temperature, damper position, supply air flow, and/or other types data measured or used by the VMA. Equipment definitions 140 allow for the abstraction (e.g., generalization, normalization, broadening, etc.) of equipment data from a specific BMS device so that the equipment data can be applied to a room or space.

Each of equipment definitions 140 may include one or more point definitions. Each point definition may define a data point of a particular type and may include search criteria for automatically discovering and/or identifying data points that satisfy the point definition. An equipment definition can be applied to multiple pieces of building equipment of the same general type (e.g., multiple different VMA controllers). When an equipment definition is applied to a BMS device, the search criteria specified by the point definitions can be used to automatically identify data points provided by the BMS device that satisfy each point definition.

In some embodiments, equipment definitions 140 define data point types as generalized types of data without regard to the model, manufacturer, vendor, or other differences between building equipment of the same general type. The generalized data points defined by equipment definitions 140 allows each equipment definition to be referenced by or applied to multiple different variants of the same type of building equipment.

In some embodiments, equipment definitions 140 facilitate the presentation of data points in a consistent and user-friendly manner. For example, each equipment definition may define one or more data points that are displayed via a user interface. The displayed data points may be a subset of the data points defined by the equipment definition.

In some embodiments, equipment definitions 140 specify a system type (e.g., HVAC, lighting, security, fire, etc.), a system sub-type (e.g., terminal units, air handlers, central plants), and/or data category (e.g., critical, diagnostic, operational) associated with the building equipment defined by each equipment definition. Specifying such attributes of building equipment at the equipment definition level allows the attributes to be applied to the building equipment along with the equipment definition when the building equipment is initially defined. Building equipment can be filtered by various attributes provided in the equipment definition to facilitate the reporting and management of equipment data from multiple building systems.

Equipment definitions 140 can be automatically created by abstracting the data points provided by archetypal controllers (e.g., typical or representative controllers) for various types of building equipment. In some embodiments, equipment definitions 140 are created by equipment definition module 154, described in greater detail below.

Still referring to FIG. 3, memory 138 is shown to include equipment objects 144. Equipment objects 144 may be software objects that define a mapping between a data point type (e.g., supply air temperature, room temperature, damper position) and an actual data point (e.g., a measured or calculated value for the corresponding data point type) for various pieces of building equipment. Equipment objects 144 may facilitate the presentation of equipment-specific data points in an intuitive and user-friendly manner by associating each data point with an attribute identifying the corresponding data point type. The mapping provided by equipment objects 144 may be used to associate a particular data value measured or calculated by BMS 11 with an attribute that can be displayed via a user interface.

Equipment objects 144 can be created (e.g., by equipment object creation module 156) by referencing equipment definitions 140. For example, an equipment object can be created by applying an equipment definition to the data points provided by a BMS device. The search criteria included in an equipment definition can be used to identify data points of the building equipment that satisfy the point definitions. A data point that satisfies a point definition can be mapped to an attribute of the equipment object corresponding to the point definition.

Each equipment object may include one or more attributes defined by the point definitions of the equipment definition used to create the equipment object. For example, an equipment definition which defines the attributes "Occupied Command," "Room Temperature," and "Damper Position" may result in an equipment object being created with the same attributes. The search criteria provided by the equipment definition are used to identify and map data points associated with a particular BMS device to the attributes of the equipment object. The creation of equipment objects is described in greater detail below with reference to equipment object creation module 156.

Equipment objects 144 may be related with each other and/or with building objects 142. Causal relationships can be established between equipment objects to link equipment objects to each other. For example, a causal relationship can be established between a VMA and an AHU which provides airflow to the VMA. Causal relationships can also be established between equipment objects 144 and building objects 142. For example, equipment objects 144 can be associated with building objects 142 representing particular rooms or zones to indicate that the equipment object serves that room or zone. Relationships between objects are described in greater detail below with reference to object relationship module 158.

Still referring to FIG. 3, memory 138 is shown to include client services 146 and application services 148. Client services 146 may be configured to facilitate interaction and/or communication between BMS controller 12 and various internal or external clients or applications. For example, client services 146 may include web services or application programming interfaces available for communication by UI clients 16 and remote applications 18 (e.g., applications running on a mobile device, energy monitoring applications, applications allowing a user to monitor the performance of the BMS, automated fault detection and diagnostics systems, etc.). Application services 148 may facilitate direct or indirect communications between remote applications 18, local applications 150, and BMS controller 12. For example, application services 148 may allow BMS controller 12 to communicate (e.g., over a communications network) with remote applications 18 running on mobile devices and/or with other BMS controllers.

In some embodiments, application services 148 facilitate an applications gateway for conducting electronic data communications with UI clients 16 and/or remote applications

18. For example, application services 148 may be configured to receive communications from mobile devices and/or BMS devices. Client services 146 may provide client devices with a graphical user interface that consumes data points and/or display data defined by equipment definitions 140 and mapped by equipment objects 144.

Still referring to FIG. 3, memory 138 is shown to include a building object creation module 152. Building object creation module 152 may be configured to create the building objects stored in building objects 142. Building object creation module 152 may create a software building object for various spaces within building 10. Building object creation module 152 can create a building object for a space of any size or granularity. For example, building object creation module 152 can create a building object representing an entire building, a floor of a building, or individual rooms on each floor. In some embodiments, building object creation module 152 creates and/or stores a building object in memory 138 for each zone or room of building 10.

The building objects created by building object creation module 152 can be accessed by UI clients 16 and remote applications 18 to provide a comprehensive user interface for controlling and/or viewing information for a particular building zone. Building objects 142 can group otherwise ungrouped or unassociated devices so that the group may be addressed or handled by applications together and in a consistent manner (e.g., a single user interface for controlling all of the BMS devices that affect a particular building zone or room). In some embodiments, building object creation module 152 uses the systems and methods described in U.S. patent application Ser. No. 12/887,390, filed Sep. 21, 2010, for creating software defined building objects.

In some embodiments, building object creation module 152 provides a user interface for guiding a user through a process of creating building objects. For example, building object creation module 152 may provide a user interface to client devices (e.g., via client services 146) that allows a new space to be defined. In some embodiments, building object creation module 152 defines spaces hierarchically. For example, the user interface for creating building objects may prompt a user to create a space for a building, for floors within the building, and/or for rooms or zones within each floor.

In some embodiments, building object creation module 152 creates building objects automatically or semi-automatically. For example, building object creation module 152 may automatically define and create building objects using data imported from another data source (e.g., user view folders, a table, a spreadsheet, etc.). In some embodiments, building object creation module 152 references an existing hierarchy for BMS 11 to define the spaces within building 10. For example, BMS 11 may provide a listing of controllers for building 10 (e.g., as part of a network of data points) that have the physical location (e.g., room name) of the controller in the name of the controller itself. Building object creation module 152 may extract room names from the names of BMS controllers defined in the network of data points and create building objects for each extracted room. Building objects may be stored in building objects 142.

Still referring to FIG. 3, memory 138 is shown to include an equipment definition module 154. Equipment definition module 154 may be configured to create equipment definitions for various types of building equipment and to store the equipment definitions in equipment definitions 140. In some embodiments, equipment definition module 154 creates equipment definitions by abstracting the data points provided by archetypal controllers (e.g., typical or representative controllers) for various types of building equipment. For example, equipment definition module 154 may receive a user selection of an archetypal controller via a user interface. The archetypal controller may be specified as a user input or selected automatically by equipment definition module 154. In some embodiments, equipment definition module 154 selects an archetypal controller for building equipment associated with a terminal unit such as a VMA.

Equipment definition module 154 may identify one or more data points associated with the archetypal controller. Identifying one or more data points associated with the archetypal controller may include accessing a network of data points provided by BMS 11. The network of data points may be a hierarchical representation of data points that are measured, calculated, or otherwise obtained by various BMS devices. BMS devices may be represented in the network of data points as nodes of the hierarchical representation with associated data points depending from each BMS device. Equipment definition module 154 may find the node corresponding to the archetypal controller in the network of data points and identify one or more data points which depend from the archetypal controller node.

Equipment definition module 154 may generate a point definition for each identified data point of the archetypal controller. Each point definition may include an abstraction of the corresponding data point that is applicable to multiple different controllers for the same type of building equipment. For example, an archetypal controller for a particular VMA (i.e., "VMA-20") may be associated an equipment-specific data point such as "VMA-20.DPR-POS" (i.e., the damper position of VMA-20) and/or "VMA-20.SUP-FLOW" (i.e., the supply air flow rate through VMA-20). Equipment definition module 154 abstract the equipment-specific data points to generate abstracted data point types that are generally applicable to other equipment of the same type. For example, equipment definition module 154 may abstract the equipment-specific data point "VMA-20.DPR-POS" to generate the abstracted data point type "DPR-POS" and may abstract the equipment-specific data point "VMA-20.SUP-FLOW" to generate the abstracted data point type "SUP-FLOW." Advantageously, the abstracted data point types generated by equipment definition module 154 can be applied to multiple different variants of the same type of building equipment (e.g., VMAs from different manufacturers, VMAs having different models or output data formats, etc.).

In some embodiments, equipment definition module 154 generates a user-friendly label for each point definition. The user-friendly label may be a plain text description of the variable defined by the point definition. For example, equipment definition module 154 may generate the label "Supply Air Flow" for the point definition corresponding to the abstracted data point type "SUP-FLOW" to indicate that the data point represents a supply air flow rate through the VMA. The labels generated by equipment definition module 154 may be displayed in conjunction with data values from BMS devices as part of a user-friendly interface.

In some embodiments, equipment definition module 154 generates search criteria for each point definition. The search criteria may include one or more parameters for identifying another data point (e.g., a data point associated with another controller of BMS 11 for the same type of building equipment) that represents the same variable as the point definition. Search criteria may include, for example, an instance number of the data point, a network address of the data point, and/or a network point type of the data point.

In some embodiments, search criteria include a text string abstracted from a data point associated with the archetypal controller. For example, equipment definition module 154 may generate the abstracted text string "SUP-FLOW" from the equipment-specific data point "VMA-20.SUP-FLOW." Advantageously, the abstracted text string matches other equipment-specific data points corresponding to the supply air flow rates of other BMS devices (e.g., "VMA-18.SUP-FLOW," "SUP-FLOW.VMA-01," etc.). Equipment definition module 154 may store a name, label, and/or search criteria for each point definition in memory 138.

Equipment definition module 154 may use the generated point definitions to create an equipment definition for a particular type of building equipment (e.g., the same type of building equipment associated with the archetypal controller). The equipment definition may include one or more of the generated point definitions. Each point definition defines a potential attribute of BMS devices of the particular type and provides search criteria for identifying the attribute among other data points provided by such BMS devices.

In some embodiments, the equipment definition created by equipment definition module 154 includes an indication of display data for BMS devices that reference the equipment definition. Display data may define one or more data points of the BMS device that will be displayed via a user interface. In some embodiments, display data are user defined. For example, equipment definition module 154 may prompt a user to select one or more of the point definitions included in the equipment definition to be represented in the display data. Display data may include the user-friendly label (e.g., "Damper Position") and/or short name (e.g., "DPR-POS") associated with the selected point definitions.

In some embodiments, equipment definition module 154 provides a visualization of the equipment definition via a graphical user interface. The visualization of the equipment definition may include a point definition portion which displays the generated point definitions, a user input portion configured to receive a user selection of one or more of the point definitions displayed in the point definition portion, and/or a display data portion which includes an indication of an abstracted data point corresponding to each of the point definitions selected via the user input portion. The visualization of the equipment definition can be used to add, remove, or change point definitions and/or display data associated with the equipment definitions.

Equipment definition module 154 may generate an equipment definition for each different type of building equipment in BMS 11 (e.g., VMAs, chillers, AHUs, etc.). Equipment definition module 154 may store the equipment definitions in a data storage device (e.g., memory 138, equipment definitions 140, an external or remote data storage device, etc.).

Still referring to FIG. 3, memory 138 is shown to include an equipment object creation module 156. Equipment object creation module 156 may be configured to create equipment objects for various BMS devices. In some embodiments, equipment object creation module 156 creates an equipment object by applying an equipment definition to the data points provided by a BMS device. For example, equipment object creation module 156 may receive an equipment definition created by equipment definition module 154. Receiving an equipment definition may include loading or retrieving the equipment definition from a data storage device.

In some embodiments, equipment object creation module 156 determines which of a plurality of equipment definitions to retrieve based on the type of BMS device used to create the equipment object. For example, if the BMS device is a VMA, equipment object creation module 156 may retrieve the equipment definition for VMAs; whereas if the BMS device is a chiller, equipment object creation module 156 may retrieve the equipment definition for chillers. The type of BMS device to which an equipment definition applies may be stored as an attribute of the equipment definition. Equipment object creation module 156 may identify the type of BMS device being used to create the equipment object and retrieve the corresponding equipment definition from the data storage device.

In other embodiments, equipment object creation module 156 receives an equipment definition prior to selecting a BMS device. Equipment object creation module 156 may identify a BMS device of BMS 11 to which the equipment definition applies. For example, equipment object creation module 156 may identify a BMS device that is of the same type of building equipment as the archetypal BMS device used to generate the equipment definition. In various embodiments, the BMS device used to generate the equipment object may be selected automatically (e.g., by equipment object creation module 156), manually (e.g., by a user) or semi-automatically (e.g., by a user in response to an automated prompt from equipment object creation module 156).

In some embodiments, equipment object creation module 156 creates an equipment discovery table based on the equipment definition. For example, equipment object creation module 156 may create an equipment discovery table having attributes (e.g., columns) corresponding to the variables defined by the equipment definition (e.g., a damper position attribute, a supply air flow rate attribute, etc.). Each column of the equipment discovery table may correspond to a point definition of the equipment definition. The equipment discovery table may have columns that are categorically defined (e.g., representing defined variables) but not yet mapped to any particular data points.

Equipment object creation module 156 may use the equipment definition to automatically identify one or more data points of the selected BMS device to map to the columns of the equipment discovery table. Equipment object creation module 156 may search for data points of the BMS device that satisfy one or more of the point definitions included in the equipment definition. In some embodiments, equipment object creation module 156 extracts a search criterion from each point definition of the equipment definition. Equipment object creation module 156 may access a data point network of the building automation system to identify one or more data points associated with the selected BMS device. Equipment object creation module 156 may use the extracted search criterion to determine which of the identified data points satisfy one or more of the point definitions.

In some embodiments, equipment object creation module 156 automatically maps (e.g., links, associates, relates, etc.) the identified data points of selected BMS device to the equipment discovery table. A data point of the selected BMS device may be mapped to a column of the equipment discovery table in response to a determination by equipment object creation module 156 that the data point satisfies the point definition (e.g., the search criteria) used to generate the column. For example, if a data point of the selected BMS device has the name "VMA-18.SUP-FLOW" and a search criterion is the text string "SUP-FLOW," equipment object creation module 156 may determine that the search criterion is met. Accordingly, equipment object creation module 156 may map the data point of the selected BMS device to the corresponding column of the equipment discovery table.

Advantageously, equipment object creation module 156 may create multiple equipment objects and map data points to attributes of the created equipment objects in an automated fashion (e.g., without human intervention, with minimal human intervention, etc.). The search criteria provided by the equipment definition facilitates the automatic discovery and identification of data points for a plurality of equipment object attributes. Equipment object creation module 156 may label each attribute of the created equipment objects with a device-independent label derived from the equipment definition used to create the equipment object. The equipment objects created by equipment object creation module 156 can be viewed (e.g., via a user interface) and/or interpreted by data consumers in a consistent and intuitive manner regardless of device-specific differences between BMS devices of the same general type. The equipment objects created by equipment object creation module 156 may be stored in equipment objects 144.

Still referring to FIG. 3, memory 138 is shown to include an object relationship module 158. Object relationship module 158 may be configured to establish relationships between equipment objects 144. In some embodiments, object relationship module 158 establishes causal relationships between equipment objects 144 based on the ability of one BMS device to affect another BMS device. For example, object relationship module 158 may establish a causal relationship between a terminal unit (e.g., a VMA) and an upstream unit (e.g., an AHU, a chiller, etc.) which affects an input provided to the terminal unit (e.g., air flow rate, air temperature, etc.).

Object relationship module 158 may establish relationships between equipment objects 144 and building objects 142 (e.g., spaces). For example, object relationship module 158 may associate equipment objects 144 with building objects 142 representing particular rooms or zones to indicate that the equipment object serves that room or zone. In some embodiments, object relationship module 158 provides a user interface through which a user can define relationships between equipment objects 144 and building objects 142. For example, a user can assign relationships in a "drag and drop" fashion by dragging and dropping a building object and/or an equipment object into a "serving" cell of an equipment object provided via the user interface to indicate that the BMS device represented by the equipment object serves a particular space or BMS device.

Still referring to FIG. 3, memory 138 is shown to include a building control services module 160. Building control services module 160 may be configured to automatically control BMS 11 and the various subsystems thereof. Building control services module 160 may utilize closed loop control, feedback control, PI control, model predictive control, or any other type of automated building control methodology to control the environment (e.g., a variable state or condition) within building 10.

Building control services module 160 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via BMS interface 132. Building control services module 160 may apply the various inputs to a building energy use model and/or a control algorithm to determine an output for one or more building control devices (e.g., dampers, air handling units, chillers, boilers, fans, pumps, etc.) in order to affect a variable state or condition within building 10 (e.g., zone temperature, humidity, air flow rate, etc.).

In some embodiments, building control services module 160 is configured to control the environment of building 10 on a zone-individualized level. For example, building control services module 160 may control the environment of two or more different building zones using different setpoints, different constraints, different control methodology, and/or different control parameters. Building control services module 160 may operate BMS 11 to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

In some embodiments, building control services module 160 uses the location of various BMS devices to translate an input received from a building system into an output or control signal for the building system. Building control services module 160 may receive location information for BMS devices and automatically set or recommend control parameters for the BMS devices based on the locations of the BMS devices. For example, building control services module 160 may automatically set a flow rate setpoint for a VAV box based on the size of the building zone in which the VAV box is located.

Building control services module 160 may determine which of a plurality of sensors to use in conjunction with a feedback control loop based on the locations of the sensors within building 10. For example, building control services module 160 may use a signal from a temperature sensor located in a building zone as a feedback signal for controlling the temperature of the building zone in which the temperature sensor is located.

In some embodiments, building control services module 160 automatically generates control algorithms for a controller or a building zone based on the location of the zone in the building 10. For example, building control services module 160 may be configured to predict a change in demand resulting from sunlight entering through windows based on the orientation of the building and the locations of the building zones (e.g., east-facing, west-facing, perimeter zones, interior zones, etc.).

Building control services module 160 may use zone location information and interactions between adjacent building zones (rather than considering each zone as an isolated system) to more efficiently control the temperature and/or airflow within building 10. For control loops that are conducted at a larger scale (i.e., floor level) building control services module 160 may use the location of each building zone and/or BMS device to coordinate control functionality between building zones. For example, building control services module 160 may consider heat exchange and/or air exchange between adjacent building zones as a factor in determining an output control signal for the building zones.

In some embodiments, building control services module 160 is configured to optimize the energy efficiency of building 10 using the locations of various BMS devices and the control parameters associated therewith. Building control services module 160 may be configured to achieve control setpoints using building equipment with a relatively lower energy cost (e.g., by causing airflow between connected building zones) in order to reduce the loading on building equipment with a relatively higher energy cost (e.g., chillers and roof top units). For example, building control services module 160 may be configured to move warmer air from higher elevation zones to lower elevation zones by establishing pressure gradients between connected building zones.

Figure 4:
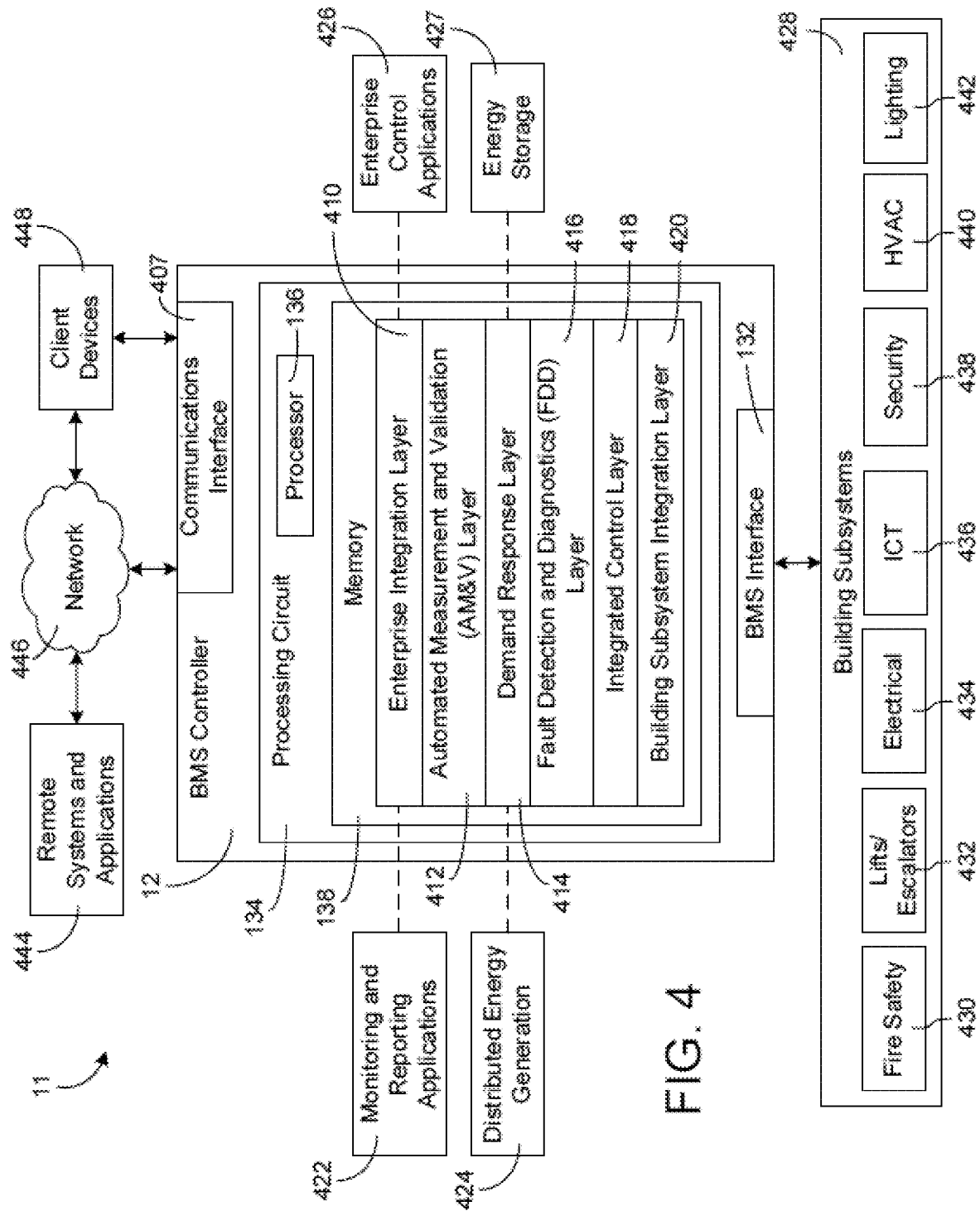
FIG. 4 is another block diagram of the BMS that serves the building of FIG. 1, according to some embodiments.

Referring now to FIG. 4, another block diagram illustrating a portion of BMS 11 in greater detail is shown, according to some embodiments. BMS 11 can be implemented in building 10 to automatically monitor and control various building functions. BMS 11 is shown to include BMS controller 12 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10.

Each of building subsystems 428 can include any number of devices, controllers, and connections for completing its individual functions and control activities. HVAC subsystem 440 can include many of the same components as HVAC system 20, as described with reference to FIGS. 2-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 12 is shown to include a communications interface 407 and a BMS interface 132. Interface 407 may facilitate communications between BMS controller 12 and external applications (e.g., monitoring and reporting applications 422, enterprise control applications 426, remote systems and applications 444, applications residing on client devices 448, etc.) for allowing user control, monitoring, and adjustment to BMS controller 12 and/or subsystems 428. Interface 407 may also facilitate communications between BMS controller 12 and client devices 448. BMS interface 132 may facilitate communications between BMS controller 12 and building subsystems 428 (e.g., HVAC, lighting security, lifts, power distribution, business, etc.).

Interfaces 407, 132 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 132 can be direct (e.g., local wired or wireless communications) or via a communications network 446 (e.g., a WAN, the Internet, a cellular network, etc.). For example, interfaces 407, 132 can include an Ethernet card and port for sending and receiving data via an Ethernet-based communications link or network. In another example, interfaces 407, 132 can include a Wi-Fi transceiver for communicating via a wireless communications network. In another example, one or both of interfaces 407, 132 can include cellular or mobile phone communications transceivers. In one embodiment, communications interface 407 is a power line communications interface and BMS interface 132 is an Ethernet interface. In other embodiments, both communications interface 407 and BMS interface 132 are Ethernet interfaces or are the same Ethernet interface.

Still referring to FIG. 4, BMS controller 12 is shown to include a processing circuit 134 including a processor 136 and memory 138. Processing circuit 134 can be communicably connected to BMS interface 132 and/or communications interface 407 such that processing circuit 134 and the various components thereof can send and receive data via interfaces 407, 132. Processor 136 can be implemented as a general purpose processor, an application specific integrated circuit (ASIC), one or more field programmable gate arrays (FPGAs), a group of processing components, or other suitable electronic processing components.

Memory 138 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 138 can be or include volatile memory or non-volatile memory. Memory 138 can include database components, object code components, script components, or any other type of information structure for supporting the various activities and information structures described in the present application. According to some embodiments, memory 138 is communicably connected to processor 136 via processing circuit 134 and includes computer code for executing (e.g., by processing circuit 134 and/or processor 136) one or more processes described herein.

In some embodiments, BMS controller 12 is implemented within a single computer (e.g., one server, one housing, etc.). In various other embodiments BMS controller 12 can be distributed across multiple servers or computers (e.g., that can exist in distributed locations). Further, while FIG. 4 shows applications 422 and 426 as existing outside of BMS controller 12, in some embodiments, applications 422 and 426 can be hosted within BMS controller 12 (e.g., within memory 138).

Still referring to FIG. 4, memory 138 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 11.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 12. In yet other embodiments, enterprise control applications 426 can work with layers 410-420 to optimize building performance (e.g., efficiency, energy use, comfort, or safety) based on inputs received at interface 407 and/or BMS interface 132.

Building subsystem integration layer 420 can be configured to manage communications between BMS controller 12 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427, or from other sources. Demand response layer 414 may receive inputs from other layers of BMS controller 12 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 11 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

System and Method for Managing the Security Health of a Network Device

Figure 5:
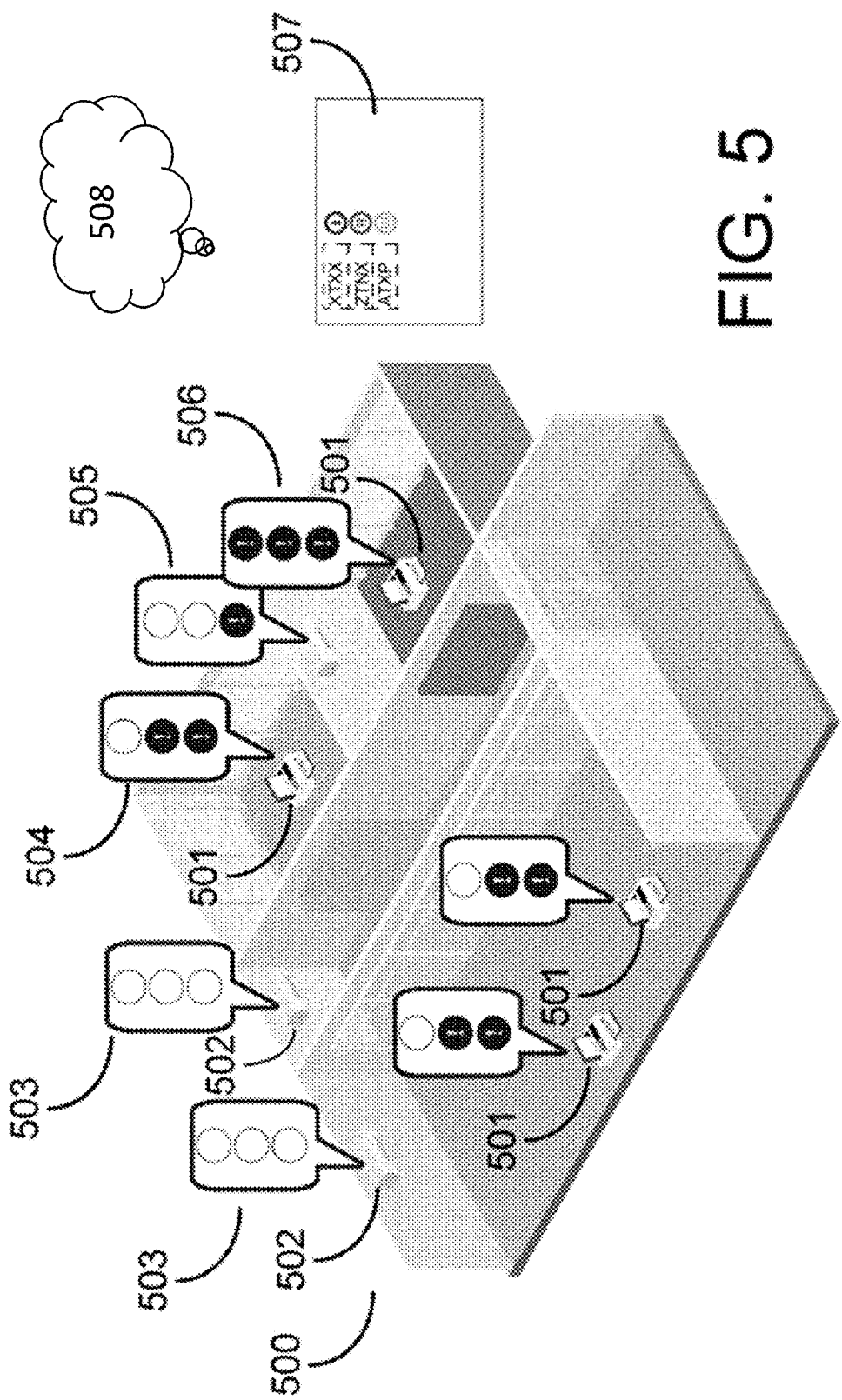
FIG. 5 is an illustration demonstrating a plurality of devices interconnected with each other in an entity, according to some embodiments.

Referring now to FIG. 5, an illustration demonstrating a plurality of devices interconnected with each other in a service provided in an entity, according to some embodiments.

The entity may be enabled by a service or facility and may exemplarily comprise a Building management solution (BMS). A BMS may comprise one or more computer systems (e.g., servers, BMS controllers, etc.) that serve as enterprise level controllers, application or data servers, head nodes, master controllers, or field controllers for the BMS. The said computer systems may communicate with multiple downstream building systems or subsystems comprising a HVAC system, a security system, a power management system and the like, in accordance with disparate protocols (e.g., LON, BACnet, etc.). The computer systems may further also provide one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the BMS, its subsystems, and devices.

Though the current disclosure is described with the service or facility as a Building Management Solution, it is to noted that the service or the facility is not limited to Building management solutions and may be implemented in any service or facility where there is a usage of devices which are operationally interconnected to a network which are prone to cyber vulnerability risks.

FIG. 5 further illustrates a facility 500 in the form of BMS, the said facility 500 comprising one or more devices (501, 502) operationally connected to a network 508.

The one or more device may further comprise more device (503, 504, 505 and 506). Each reference numeral labelled at one or more points depicts a device having same configuration. In an embodiment, devices 501 may comprise a laptop, a desktop or a fax machine. In similar embodiments, device 502 may comprise an indoor unit of air conditioner. In similar embodiments, device or signal state 503 may comprise network architecture present within devices 502. In similar embodiments, device or signal state 504 may comprise network architecture of the 501. In similar embodiments, device or signal state 505 may comprise one or more controllers of the device 502 located at another location or a specific location. In similar embodiments, device 506 may comprise one or more controllers of the device 501 located at another location or a specific location.

It is to be understood that FIG. 5 discloses one or more devices (501-506) for single part of a facility 500, but they are not limited by the single part of facility 500 and may comprise all the devices present within facility provided for an entity. The facility may be further filtered by specific parts, floors, buildings, areas and locations.

In an embodiment, a cyber risk score is generated for each of the one or more devices (501-506). The method for generation of the cyber risk score is further described in the present disclosure.

As disclosed above, the one or more devices labelled at one or more points depicts a device having same configuration. The configuration may further comprise the same model type having same processing instructions or different processing instructions. In an embodiment, each device having the same configuration which are located at different location may have a different cyber risk score.

In an exemplary embodiment, the network architecture hosting the OT device can lead to the devices being more vulnerable. This is reflected in the different risk score for the same devices —504, 505 and 506.

The output of the having cyber risk scores may further enable to develop a ranked list 507 of vulnerable devices across the network 508. In an embodiment, the ranked list may be used by a cybersecurity manager or by any person responsible for monitoring the ranked list of the facility to identify which devices on a network are at risk and which devices should be prioritized for corrective action. The ranked list may be implemented in a number of formats comprising a web enabled dashboard or an automated alert system comprising an automated e-mail to alert the cybersecurity manager of the problem related to cyber risk.

Figure 6:
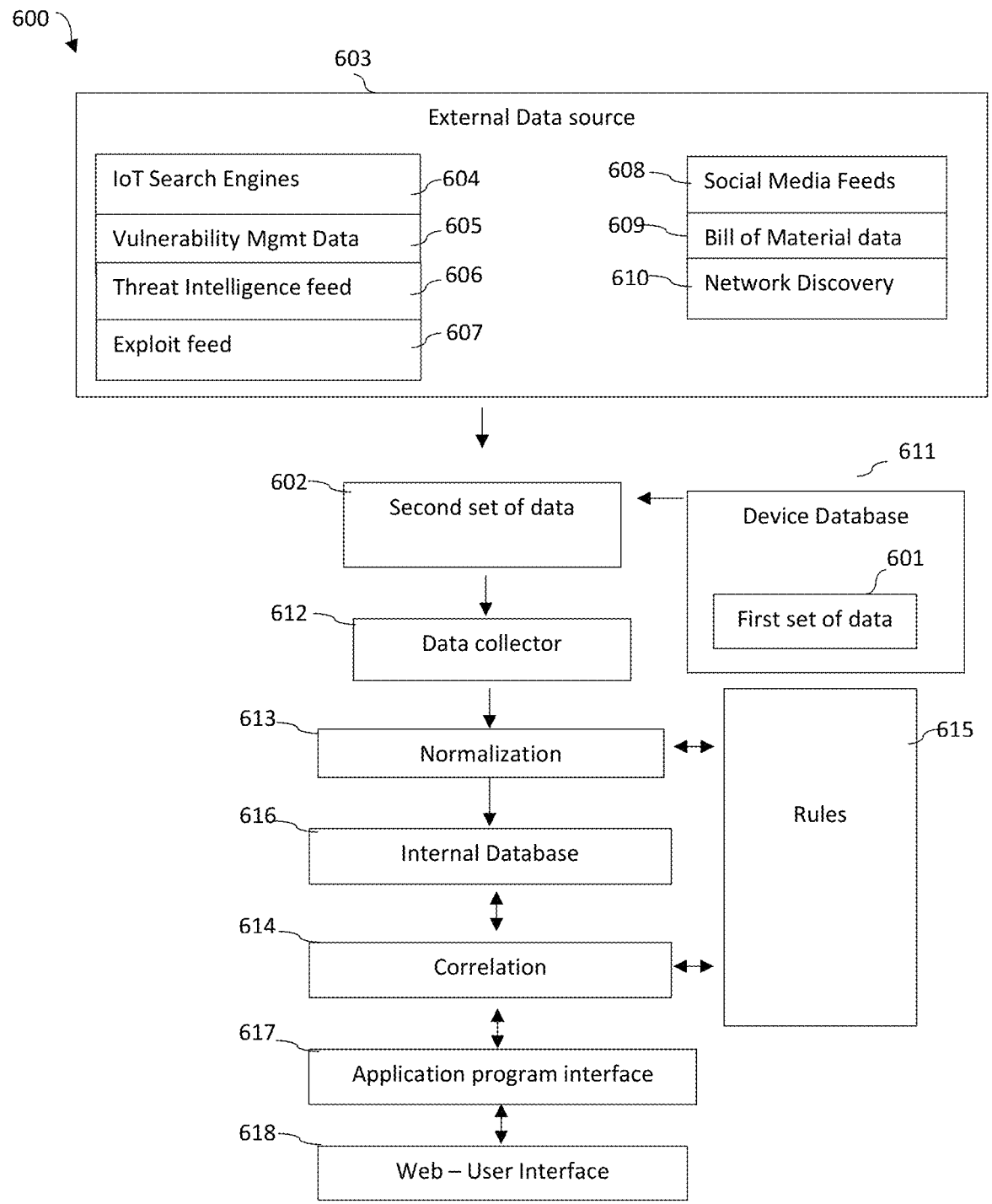
FIG. 6 is an architecture for managing the security health of a plurality of networked devices interconnected with each other in a service provided in an entity, according to some embodiments.

Referring now to FIG. 6, an architecture 600 for managing the security health of a plurality of networked devices interconnected with each other in a service provided in an entity is shown.

In an embodiment, the architecture 600 may be implemented as an application or a service which is further applied to an entity. An entity may be building or its sub-parts comprising a floor, zones, and rooms with one or more services. The entity may further comprise a group of buildings out which some building may be in same location and some may be in different locations. The architecture 600 may comprise a first set of data 601 comprising information collected from individual network devices. The first set of data may be selected from a group consisting of device configuration, IP address, MAC address and data related to software operated on the network devices.

In an embodiment, for a camera implemented in a building management solution, the first set of data for the camera may comprise camera's configuration, IP address, MAC address and data related to software operated on the camera. In a similar embodiment, the first set of data for a controller of a boiler may comprise the configuration of controller, type of controller, IP address, MAC address and the data related to software operated on controller of the boiler. Similar data is collected for all the components present in the Building Management Solution and stored in the first set of data.

The architecture may further comprise a second set of data 602 that may be accessed and used to create a cyber-security risk score. The second set of data 602 may comprise data collected from external data source(s) 603 which enables the system to determine a factor for determining cyber risk score for each device. The external data source(s) 603 may comprise accessing data from sources comprising IoT search engine results 604 relating to known vulnerabilities for particular device makes or models, vulnerabilities management data (such as Common Vulnerabilities and Exposure Details) 605, threat intelligence feeds 606, exploit feeds 607, social media feeds (such as DataMinr) 608, bill of material (BOM) collector data 609 (to identify individual components that have known vulnerabilities), and network discovery information (such as discoverability through ping tests) 610. Connections to data sources can be through API or data scraping services. A service, running on the network, using a list of identified OT devices within the facility, automatically aggregates data from multiple sources related to architectural, contextual, and social media information of each identified OT devices.

In an embodiment, the architectural data may comprise one or more tier architectures. In another embodiment, the contextual data may comprise contextual information of at least one of process, an event, an occupant and the one or more network devices. In yet another embodiment the social media data may comprise at least one of social data of the entity, personal data of the entity, social data of an occupant, and personal data of an occupant.

The first set of data 601 is stored in device database 611. The feed defined within the second set of data 602 is ingested or collected by a Data collector 612 along with a list of OT devices from a device database 611. The list of OT devices may be automatically generated by searching through a network or predefined. For example, in one embodiment of the present disclosure, a service running on the network may automatically identify each OT device.

A normalization routine 613 and a correlation routine 614 along with a set of rules 615 are used to codify, normalize, and correlate the data from the above and other sources to compute the cyber risk score. For example, the risk identified for one device from an IoT search engine must be compared to the risk identified from other feeds such as a threat intelligence feed. Predefined weights are used to correct for disparities. Similarly, combining scores for individual devices from multiple sources must be weighted.

In an embodiment, the risk score may be stored in an internal database 616 that may be continually updated each time the routine is run. The history of how this score changes over time may also be used in further trend analysis.

The results of the process may be accessed through an Application Program Interface (API) 617 and a web-based user interface 618. Current and historical scores are displayed along with data trends.

It is to be noted that the architecture 600 is driven by a server (not show in figure), comprising a processing circuit having a memory storing processing instructions, said processing circuit configured to perform all the processes comprising and not limiting to collection of data, normalization of data, correlation of data and determination cyber security score for individual network devices and the entity.

A risk score, specifically related to the OT devices on the network may be automatically generated and updated. This score is derived from a combination of architectural, contextual, and media extracted data along with the data factors.

Figure 7:
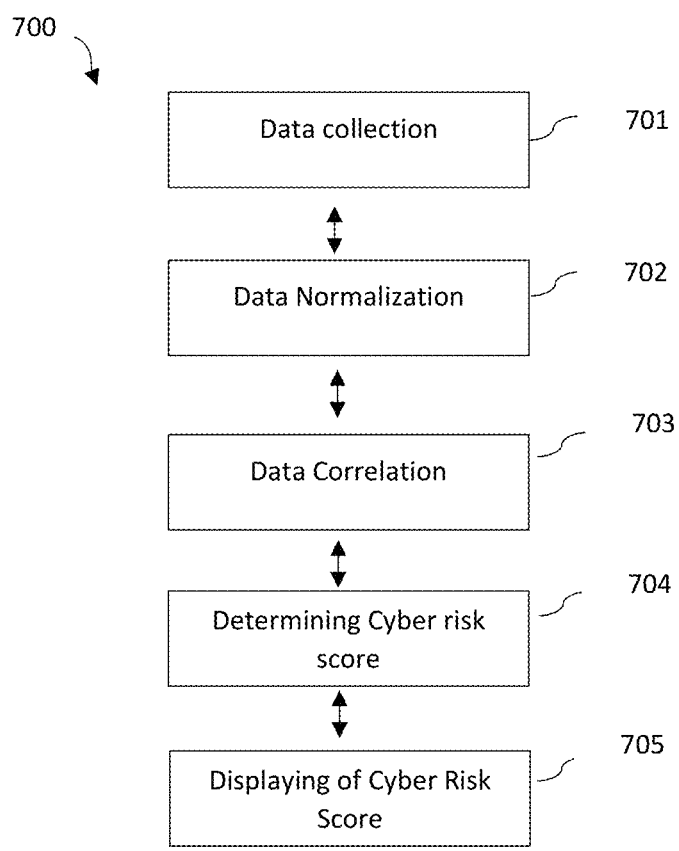
FIG. 7 is a Method 700 for managing the security health of a plurality of networked devices interconnected with each other in a service provided in an entity, according to some embodiments.

Referring now to FIG. 7, a method 700 for managing the security health of a plurality of networked devices interconnected with each other in a service provided in an entity is shown.

The method may comprise the step 701 of collecting a plurality of data being fetched from each of the devices and accessing data from one or more data sources via a network to form a collected data, wherein the data being fetched from each of the devices and the data accessed from the one or more sources device comprises architectural data, contextual data and social media data.

The method may further comprise the step 702 of normalizing the collected data for each of the devices to create standard data, wherein the collected data from each of the device is processed by decomposing to generate said standard data. Normalization may be an internal process which may enable to decompose the data received from the one or more sources and databases the entity has collected from the databases and create a standard data which may be used for correlation process. The normalization is executed in a similar manner for the data received is used for sensors or third party vendor datasources, or external feeds like NVD, Shodan and the like. In an embodiment, a camera firmware version from one of camera devices is received in raw format and converted into a standard data by naming scheme like CPE in order to have a standard datastore.

The method may further comprise the step 703 of correlating, the standard data of each device with one or more data factors and a hierarchy of said device to determine cyber risk score for each of said devices. The correlation is a process to compare the different data which are normalized and stored in the internal database which is received from external sources with the device data used to calculate risk score. In an embodiment, a camera firmware version (data used to calculate the risk) from one of our assets once normalized is correlated against the datastores like NVD (to check if exists vulnerabilities) and external sources (for example twitter to see if somebody is talking about an exploit of the vulnerability previously identified) in order to calculate the risk score based on the information received.

The method may further comprise the step 704 of correlating, the standard data of each device with one or more data factors and the hierarchy of said device to determine cyber risk score for each of said devices.

In an embodiment, a hierarchy may comprise the plurality of networked devices which are present in a network in an order. In a building management solution, there may be facilities comprising security, building data, lighting, room scheduling, Heating, Ventilation and Air Conditioning, voice and communications, fire detection and the like. Each service may comprise a devices listed in a hierarchy. For example, in a lighting facility, a main controller is enabled to control all the sub-controllers wherein the sub-controllers may relates to one or more zones of a building. The sub-controllers may have a control over each lighting device. In the above embodiment, the main controller is at the top position, the sub-controllers are at the medium level positions and the lighting devices are at the lowest position in the hierarchy. The first set of data may comprise the data of each device in accordance with the one or more levels of hierarchy. Moreover to lighting service, the hierarchy may comprise for services comprising security, building data, room scheduling, Heating, Ventilation and Air Conditioning, voice and communications, fire detection and the like.

The method may further comprise the step 705 of displaying the cyber risk score in a format as commanded by a user through a web-based user interface. The application programming interface is enabled to display the cyber risk for at least one of individual network devices or is enabled to display the total cyber risk score of the entity which is an outcome of the aggregation of one or more devices present in the entity.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for determining and using a cyber risk score for an entity having a plurality of devices on a network, the method comprising:
    collecting, by a processing circuit, a first set of data from individual network devices and a second set of data including risk data from an external data source, wherein the external data source is selected from a group consisting of an IoT search engine, a vulnerability management database, a threat intelligent feed, an exploit feed, a social media feed, a bill of material, and a network discovery;
    normalizing, by the processing circuit, the first set of data and the second set of data;
    correlating, by the processing circuit, the normalized first set of data with the normalized second set of data to determine individual cyber risk scores for the individual network devices;
    determining, by the processing circuit, the cyber risk score for the entity by aggregating the individual cyber risk scores for the individual network devices and using the individual cyber risk scores for the individual network devices as inputs to calculate the cyber risk score for the entity; and
    using, by the processing circuit, the cyber risk score for the entity or the individual cyber risk scores for the individual network devices to perform an automated action comprising at least one of (i) providing an alert to a user comprising the cyber risk score for the entity or the individual cyber risk scores for the individual network devices, (ii) generating a dashboard comprising the cyber risk score for the entity or a ranked list of the individual network devices based on the individual cyber risk scores for the individual network devices, or (iii) initiating a corrective action responsive to the cyber risk score for the entity or the individual cyber risk scores for the individual network devices.

2. The method of claim 1, wherein the second set of data comprises at least one of architectural data, contextual data, or social media data.

3. The method of claim 1, wherein normalizing the first set of data and the second set of data includes decomposing the first set of data and the second set of data.

4. The method of claim 1, further comprising correlating a hierarchy of the network devices with the normalized first and second sets of data.

5. The method of claim 1, wherein determining the individual cyber risk scores is based on at least one of geographical location of the network device, cyber vulnerability of the network device, or a combination thereof.

6. The method of claim 1, wherein the first set of data is selected from the group consisting of device configuration, IP address, MAC address, and data related to software operated on the network devices.

7. The method of claim 1, further comprising receiving a command from a user requesting a display format and displaying, on a user interface, at least one of (a) the cyber risk score for the entity or (b) one or more of the individual cyber risk scores.

8. The method of claim 1, further comprising storing or updating the individual cyber risk scores in a memory.

9. The method of claim 1, wherein determining the individual cyber risk scores of the individual network devices and the cyber risk score of the entity occurs in real time or near real time.

10. A system for determining and using a cyber risk score for an entity having a plurality of network devices, the system comprising:
a server, comprising a processing circuit having a memory storing processing instructions, said processing circuit configured to:
collect a first set of data from individual network devices and a second set of data including risk data from an external data source, wherein the external data source is selected from a group consisting of an IoT search engine, a vulnerability management database, a threat intelligent feed, an exploit feed, a social media feed, a bill of material, and a network discovery;
normalize the first set of data and the second set of data;
correlate the normalized first set of data with the normalized second set of data to determine individual cyber risk scores for the individual network devices;
determine the cyber risk score for the entity by aggregating the individual cyber risk scores for the individual network devices and using the individual cyber risk scores for the individual network devices as inputs to calculate the cyber risk score for the entity; and
using the cyber risk score for the entity or the individual cyber risk scores for the individual network devices to perform an automated action comprising at least one of (i) providing an alert to a user comprising the cyber risk score for the entity or the individual cyber risk scores for the individual network devices, (ii) generating a dashboard comprising the cyber risk score for the entity or a ranked list of the individual network devices based on the individual cyber risk scores for the individual network devices, or (iii) initiating a corrective action responsive to the cyber risk score for the entity or the individual cyber risk scores for the individual network devices.

11. The system of claim 10, wherein the second set of data comprises at least one of architectural data, contextual data, or social media data.

12. The system of claim 11, wherein the architectural data comprising one or more tier architectures, the contextual data comprising contextual information of at least one of a process, an event, an occupant, the network devices, or the social media data comprising at least one of social data of the entity, personal data of the entity, social data of an occupant, or personal data of an occupant.

13. The system of claim 10, wherein the processing circuit is configured to normalize the first set of data and the second set of data by decomposing the first set of data and the second set of data.

14. The system of claim 10, wherein the processing circuit is configured to correlate a hierarchy of the individual network devices with the normalized first and second sets of data in determining the individual cyber risk scores.

15. The system of claim 10, wherein each individual cyber risk score is determined by factoring in geographical location and cyber vulnerability of the individual network device.

16. The system of claim 10, wherein the processing circuit is configured to display and sort the individual network devices by the individual cyber risk scores.

17. The system of claim 10, wherein the processing circuit is configured to store or update the individual cyber risk scores in the memory.

18. The system of claim 10, wherein the processing circuit is configured to determine the individual cyber risk scores of the individual network devices and the cyber risk score of the entity in real time or near real time.

19. The system of claim 18, wherein one or more of the cyber risk scores of the network devices or the entity is presented to a user on a user interface.

* * * * *